Figure 1:
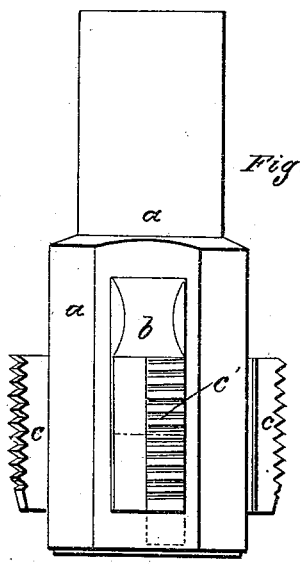

C. C. WALWORTH.
Screw Cutting Tap.

No. 40,203.

Patented Oct. 6, 1863.

Witnesses:
Francis Fowler
J. V. Crosby

Inventor:
C. C. Walworth

UNITED STATES PATENT OFFICE.

CALEB C. WALWORTH, OF BOSTON, MASSACHUSETTS.

IMPROVED TAP FOR CUTTING SCREW-THREADS.

Specification forming part of Letters Patent No. 40,203, dated October 6, 1863.

*To all whom it may concern:*

Be it known that I, CALEB C. WALWORTH, of Boston, in the county of Suffolk and State of Massachusetts, have invented an Improved Tap for Cutting Screw-Threads; and I do hereby declare that the following, taken in connection with the drawings, which accompany and form part of this specification, is a description of my invention sufficient to enable those skilled in the art to practice it.

It is known where ordinary taps have a taper form that those portions of their screw-threads which follow their cutting edges or faces in the act of cutting female threads are larger than the paths cut by said edges or faces, so that in the use of such taps a great deal of power is expended in tending to stretch the object to be tapped, and such objects consequently have to be made larger and heavier than actually needed in their functions, to avoid being split or bursted in the tapping process. It has been sought to remedy this drawback to the use of solid taper taps by dressing off from beyond the cutting-faces of the threads some of the material following the faces—that is to say, the threads have been filed back from the form in which they are left by the action of the lathe from each channel or groove formed along the length of the tap, to make a cutting edge or face to that groove immediately succeeding in the direction in which the tap is rotated when cutting-screw-threads. Such taps work easily, but, as they soon wear and therefore lose their normal size, they become useless, having no capacity for repair or adjustment. Taps similar to those last mentioned have been made by recentering them after the screw-threads have been cut thereupon on the real or main center, and after the grooves have been cut along the length of the taps to form the cutting-faces, and then, by partial rotations in the lathe on the newly-formed centers, those parts of the threads which follow one face and precede another are dressed off so as to leave the cutting-faces of the threads their most prominent part. This is a more finished way of reducing the tap, so that it will work with little power applied, but a tap so made is expensive, perhaps more so than the file-dressed taps before alluded to, and has all their defects.

My invention is an improvement on solid taps, both straight and taper, and consists in forming them of bits or cutters, secured in a holder when the bits or cutters have this distinguishing characteristic—viz: They are cut on a common center, and are then removed from the position relative to the center in which they are cut, and are so confined in a holder that the cutting-faces are the prominent parts of the whole taps, as combined and confined in the holder, when considered with relation to the rotation of the tap in its cutting function.

Figure 2:
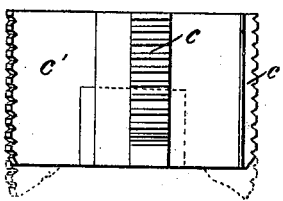
Figure 3:
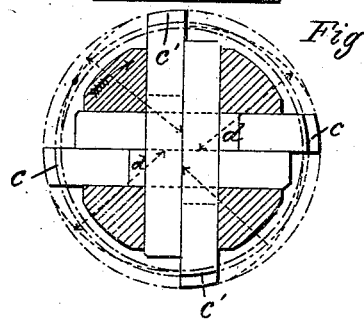
Figure 4:
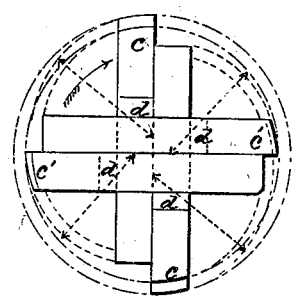
Figure 5:
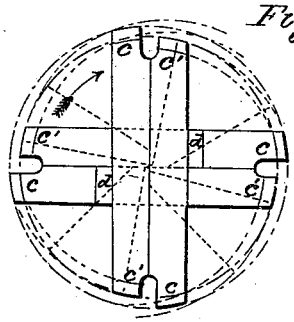
Figure 6:
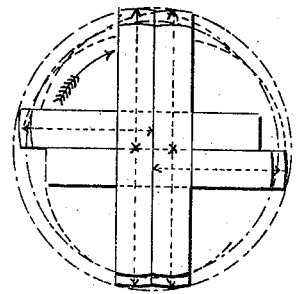

Figure 1 represents the holder *a*, containing the bits or cutters, which may be two or more in number, confined by a key, *b*, though I prefer to employ four bits or cutters, as shown in all the figures of the drawings, and to have but one cutting end to each bit. Fig. 2 shows the bits or cutters *c* in elevation, and as removed from the holder. Fig. 3 shows the bits or cutters in place, and the holder *a* in horizontal cross-section. Figs. 4, 5 and 6 illustrate in plan modifications of the arrangement of the bits or cutters.

The holder has two mortises formed through it at right angles to each other, the width of each being equal to the thickness of the cutter or cutters therein contained, the height or depth of one mortise being equal to the width of the cutters, while the other mortise, starting from the same level, exceeds this dimension sufficiently to admit of the insertion of the key *b* over the bits or cutters. These are halved together, half of the depth of each cutter being removed at the center, to admit of the cutters being interlocked in the form of a cross, so that when thus interlocked and secured in a holder suitable screw-threads can be cut on the outer ends of the bits, concentric with the axis of the holder, the threads being cut of smaller diameters than the tap is intended to form, but the pitch and shape of the threads being identical with those which the tap is to make in the exercise of its functions. After the threads are cut on the outer ends of the bits sufficient material is removed from one end of the opening formed in each bit to permit the movement of the operative end of each bit or cutter away from the center on which it was formed to the periphery of the circle which it is intended to have formed or cut by the taps, said end of the opening so cut away being that farthest from the operative ends of the bits. The bits are then kept in their new position relative to the center of the holder by filling-pieces $d$, placed between the sides of the cutters and the ends of the openings formed in the cutters. When the parts are thus fitted, the steel bits or cutters may be hardened, and will then be ready for use in conjunction with the holder, which may be of iron. When the parts are worn so as to materially diminish the size of the hole screw-threaded by the taps, the temper may be drawn from the bits, and these may then have their threads V's or teeth cut anew, and by removing sufficient material from the proper end of the central opening found in each bit, and by providing enlarged filling pieces, and by again hardening the bits, the tap is restored to its original size, sharpness, and usefulness. By this invention the risk of damage in hardening and tempering the tap heretofore existing is greatly diminished.

In Fig. 3 the dotted line in red, which makes a complete circle, and is concentric with the center of the holder, shows the outer periphery to which the teeth in that example were cut, the four witnessed centers being then in the center of the holder, and the cutters afterward fixed in the position shown, so as to tap a thread, the bottom and top of which are shown in solid blue lines.

In Fig. 3 the teeth of each bit are represented as full-threaded, while in Fig. 4 the bits marked $c'$ are not formed to cut the bottom of female threads, but are shown, as also in Figs. 1 and 2, (where there marked,) as minus the salient angles which those bits marked $c$ have.

In Fig. 4 the bits $c'$ are so arranged as to act as boring-tools, cutting only any material which may exist inside of the inner line in blue, which line marks the boundary of the tops of the female threads to be formed by the tap. When thus used or farther advanced to cut a portion of the threads, the entering portions of the bits $c'$ must be so arranged with reference to bits $c$ as to cut first, which is accomplished practically by grinding off the teeth farther back from the entering part of bits $c$ than from bits $c'$, so that $c'$ will cut and clear the way for $c$. This produces the same result as would the extension of the bits $c'$, as shown in red lines below the bits $c$ in Figs. 1 and 2.

In Fig. 5 each bit $c$ is accompanied by a bit, $c'$, both ends of each bit piece being formed into cutters, while in Figs. 3 and 4 only one end of each bit-piece is employed; but it is evident that it is only while new that both ends of a bit-piece can be used, because, when shortened by wear and sharpening, one end of the bit-piece must be thrust outward in compensation, drawing in the other end.

In Fig. 5 a portion of each bit is removed, as shown near their cutting ends, to allow the chips cut by the finishing-cutters $c$ to clear.

In all the figures the dotted arcs of circles in red are intended to show the retirement of the back part of the V's from their cutting-faces, thus showing that the surfaces of both straight and taper taps made embodying my invention, except their cutting edges, rotate clear of the surfaces formed by the cutting action of my tap, and in all the figures, except Fig. 6, the bit-pieces have their threads cut upon them in the same circles relative to the common center which they occupy when forming an operative tap; but in Fig. 6 each bit-piece has its threads formed while occupying a primitive center of rotation, and, when arranged in the tap, the centers on which the bits were formed are moved outward from the center of the tap. Wear in a tap so made is compensated for, as before described, by filling-pieces and by suitable removal of material from the center of the bit-pieces where they cross.

The keys or filling-pieces $d$, used to keep the bits in their cutting position, are generally brazed or soldered in position, and when the cutting-faces of the bits become worn, or it is necessary or desirable to recut or recenter them, or to change their position, the pieces $d$, are unsoldered and removed, and the bits carried back to their primitive position, or carried in or out into any new position in which it is desirable to operate them, the pieces $d$ being changed or varied in thickness as the cutting-circle of the bits is changed. These pieces are shown in the drawings (in order to clearly illustrate the invention) of a much greater thickness than is necessarily employed.

I claim—

The tap, constructed and operating substantially as described.

C. C. WALWORTH.

Witnesses:
 FRANCIS GOULD,
 J. B. CROSBY.